(12) United States Patent
Acey

(10) Patent No.: US 6,490,826 B2
(45) Date of Patent: *Dec. 10, 2002

(54) METHODS OF UTILIZING A FINELY DIVIDED MINERAL COMPOSITE

(76) Inventor: Eugene Acey, 5175 Ormond Rd., Davisburg, MI (US) 48350

(*) Notice: Subject to any disclaimer, the term of this patent is extended or adjusted under 35 U.S.C. 154(b) by 0 days.

This patent is subject to a terminal disclaimer.

(21) Appl. No.: 09/961,472

(22) Filed: Sep. 24, 2001

(65) Prior Publication Data

US 2002/0033034 A1 Mar. 21, 2002

Related U.S. Application Data

(63) Continuation of application No. 09/458,517, filed on Dec. 13, 1999, now Pat. No. 6,293,047, which is a continuation of application No. 09/115,751, filed on Jul. 15, 1998, now abandoned.
(60) Provisional application No. 60/052,677, filed on Jul. 16, 1997.

(51) Int. Cl.[7] ............................................. C05D 1/00
(52) U.S. Cl. ....................... 47/58.1; 47/DIG. 10; 71/6; 71/11; 71/32; 71/62; 71/903
(58) Field of Search ........................ 47/58.1, DIG. 10; 71/6, 11, 32, 62, 903; 210/610

(56) References Cited

U.S. PATENT DOCUMENTS

| | | | |
|---|---|---|---|
| 4,297,122 A | 10/1981 | Wallace | 71/12 |
| 6,293,047 B1 | 9/2001 | Acey | 47/58.1 |

*Primary Examiner*—Wayne A. Langel
(74) *Attorney, Agent, or Firm*—Carrier, Blackman & Associates, P.C.; William D. Blackman; Joseph P. Carrier

(57) ABSTRACT

A mineral composite consists essentially of a naturally occurring glacial deposit comprising not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0–0.5 weight percent P, 0–0.01 weight percent Ba, and 0–0.005 Cr; and wherein the mineral composite is in powdered form with a mean particle size of 2–20$\mu$ and with a surface area of least of 0.8–1.5 $m^2/cm^3$ of the composite. Other additives may be added to the mineral composite to make it even more effective for treating soil. Methods of making and using the mineral composite are also described.

17 Claims, 2 Drawing Sheets

METHODS OF UTILIZING A FINELY DIVIDED MINERAL COMPOSITE

CROSS-REFERENCE TO RELATED APPLICATIONS

The present application is a continuation of U.S. patent application Ser. No. 09/458,517, filed on Dec. 13, 1999, now issued as U.S. Pat. No. 6,293,047, which was a continuation of U.S. patent application Ser. No. 09/115,751, filed Jul. 15, 1998, now abandoned which, in turn, claimed the priority date, under 35 U.S.C. 120, of provisional U.S. patent application Ser. No. 60/052,677, filed Jul. 16, 1997.

The disclosure of provisional U.S. patent application Ser. No. 60/052,677, filed Jul. 16, 1997 is hereby incorporated by reference.

BACKGROUND OF THE INVENTION

1. Field of the Invention

The present invention relates to a mineral composite, and particularly to a finely divided or powdered mineral composite, containing a wide variety of minerals in a small, relatively uniform particle size, which may be added to soil for stimulating activity of beneficial fungi and other useful microorganisms contained therein, and for thereby enhancing the growth rate and mineral content of plants and vegetables grown in the soil. The invention also pertains to methods of using the composite to treat soil, and to methods of growing plants, having enhanced mineral content, in such treated soil.

2. Description of the Relevant Art

There are known mineral composites for being added to soil, compost and the like to stimulate the activity of microorganisms, to counter balance the natural acidity of the soil, etc. Some of such known mineral composites include Azomite® by Peak Minerals of Colorado Springs, Colo., Mineral Rite™ by Vulcan Materials Company of Winston-Salem, N.C., Sacred Mountain Mineral soil additive by Sacred Mountain Minerals of Rohnert Park, Calif., and Bio 2™ glacial rock powder by Meridian Environmental Group, Inc. of Okemos, Mich. Each of these known products is essentially powdered rocks such as the dust or fines from a gravel pit, sea bed or the like, and contains a large variety of minerals, mostly in the form of oxides or other compounds.

Further, there are known publications which specifically address and advocate the practice of soil remineralization through addition of rock powders thereto. One such publication is *Remineralize The Earth*, a periodical published by Remineralize the Earth, Inc. of Northampton, Mass. This publication discusses various mineral composites which have been added to soils by persons for various reasons, and various effects achieved thereby. Several books are available which discuss adding rock powder to soil, including *Bread from Stones* by Dr. Julius Hensel, *Secrets of the Soil* by Peter Tompkins and Christopher Bird, and *The Survival of Civilization* by John Hamaker and Don Weaver.

Although the known mineral composites, including those discussed above and in the known publications, are somewhat useful and effective as soil additives, they still remain to be improved upon. For example, each of the Azomite®, Sacred Mountain Mineral, Vulcan materials and Bio 2™ mineral supplements contain a large proportion of silicon in the form of silicon dioxide or sand ($SiO_2$), i.e., between 49% and 87% by weight of the entire composition is silicon dioxide, whereas silicon dioxide has relatively little stimulative effect on microorganisms in the soil as compared with other minerals such as ferric oxide ($Fe_2O_3$), calcium oxide (CaO), magnesium oxide (MgO), etc.

Further, the known mineral composites, although in powdered form, have relatively large or coarse, and non-uniform particle sizes. For example, a sample of the Bio2™ product was analyzed and found to have an average particle size of 22.28 microns, and with only 86% of the particles able to pass through a 325 mesh (44 micron) screen. Larger particle size for the mineral supplements is not desirable, because larger particles present less accessible surface area than smaller particles would. As a result, larger particles have less stimulatory effects on the microorganisms in the soil, i.e., they are not readily or easily assimilated by the microorganisms and plants, whereby a lesser overall stimulatory effect is achieved even if a larger quantity of the mineral composite is applied.

U.S. Pat. No. 4,927,122 to Wallace discloses a method for the biological degradation of organic containing waste matter, in which a mineral composite consisting essentially of a glacial deposit is added to the waste matter, in an amount ranging from 1 part mineral composite per 15 parts organic matter contained in the waste matter, to 1 part mineral composite per 400 parts organic matter. The particle size disclosed in this reference is below about 70% mesh size at 100 mesh, and preferably, below about 70% of mesh size at 200 mesh. The disclosure of Wallace U.S. Pat. No. 4,927,122 is hereby incorporated by reference.

The present invention has been developed to overcome the limitations and disadvantages associated with the known mineral composite additives.

SUMMARY OF THE INVENTION

It is an object of the invention to provide a mineral composite for use as a soil additive having an effective combination of numerous mineral oxides as might be found in a natural glacial deposit, a gravel quarry or the like, but wherein the supplement has a reduced silicon content as compared to the conventional glacial deposits, sea beds, rock quarries, etc. which are used in making the conventional mineral composites. Preferably, the mineral composite according to the present invention has not more than 20 percent, by weight, of silicon.

It is another object of the invention to provide such a mineral supplement having a very fine particle size to achieve a prompt, optimum stimulatory effect on microorganisms in the soil, in waste water, in compost or solid waste, etc.

It is another object of the invention to provide a simple and economic method of making the mineral composite from naturally occurring glacial deposits, rock quarries, etc.

It is yet another object of the invention to provide a simple and effective method for remineralizing soil using the mineral supplement, and optionally, this method may also involve treating the soil with mycorrhizae spores, with externally added bacteria, with humate, with a biodegradable carbohydrate source, and/or with other beneficial additives. These additives are preferably added to the mineral composite before adding it to the substrate to be treated.

According to the invention there is provided a mineral composite consisting essentially of a naturally occurring glacial deposit comprising not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0–0.5 weight percent P, 0–0.01 weight percent Ba, and 0–0.005 Cr; and wherein the mineral composite is in powdered form, with an average particle size of 2–20 microns, possibly 1–10 microns, and preferably 1–9 microns. In a preferred embodiment of a mineral composite in accordance with the present invention, over 90% of the mineral composite has a mean particle size less than or equal to $10\mu$, based on the total number of particles, and with a surface area of at least 0.8 m$^2$/cm$^3$.

The above components of the mineral composite are present in compound form, typically oxides, and the mineral composite also preferably comprises approximately 50–65 other elements due to the natural occurrence thereof in the glacial deposit, although the other elements are mostly present in relatively small quantities.

The other elements may include 2–15 weight percent C, 0.00005–0.005 weight percent of each of Ni and Zn, 0.0005–0.02 weight percent Rb, 0.005–0.1 weight percent Sr, 0.001–0.025 Zr, 0.0001–0.01 weight percent La, 0.00005–0.005 Gd, 0.00005–0.0005 Yb, 0.0001–0.0025 weight percent of each of Pb and Li, 0.00005–0.0150 weight percent Y, 0.00005–0.0025 weight percent Ce, 0.00001–0.0015 weight percent Yb, 0.0001–0.0025 weight percent B, 0.0005–0.01 weight percent Ga, 0.00005–0.0005 weight percent of each of Er and Lu, 0.0001–0.0025 weight percent V, 0.0001–0.0025 Sc, and trace amounts of Be, Co, Cu, Ge, As, Se, Nb, Mo, Ru, Rh, Pd, Cd, Sn, Te, Cs, Nd, Sm, Eu, Tb, Di, Ho, Tm, Hf, Ta, W, Os, Ir, Pt, Au, Hg, Tl, Th, Ag, Sb, Pr, Re, Bi, and U.

Also preferably, as a result of being finely divided, the mineral composite according to the invention will have average particle size of between 2 and 20 microns, preferably less than 10 microns, and at least 0.8 square meters of surface area per cubic centimeter of the mineral composite.

It has been found that the mineral composite as described above is particularly effective for stimulating microbiological activity in soil in relatively small doses, e.g., 1–12 kilograms per cubic meter of soil, preferably 1–7 kg of the mineral composite per cubic meter of soil, although greater or lesser amounts of the composite may be added to the soil for achieving an optimum result, depending on the organic content of the soil. Soil with a high organic content can utilize a greater quantity of the composite because the higher organic content of the soil can appropriately sustain a higher level of enhanced microbiological activity. Additionally, the mineral composite provides relatively immediate results because its very small particle size permits it to be readily assimilated by the microorganisms in the soil and by the plants growing in the soil.

In particular, the mineral composite according to the present invention is believed to be especially effective in promoting the growth of beneficial symbiotic mycorrhizae fungi on the roots of growing plants, which leads to the growth of healthier plants.

Also according to the invention there is also provided a method of forming a mineral composite comprising the steps of: obtaining a naturally occurring glacial deposit including not more than 20 weight percent Si, 10–20 weight percent Ca, 2–10 weight percent Mg, 1–10 weight percent Fe, 1–10 weight percent K, 1–10 weight percent Al, 0–3.0 weight percent Na, 0–1.0 weight percent Ti, 0–1.0 weight percent Mn, 0–0.5 weight percent P, 0–0.5 weight percent Ba and 0–0.005 Cr; and pulverizing the glacial deposit into a fine powder having a mean particle size of 1–20$\mu$ and a surface area of at least 0.8–1.5 m$^2$/cm$^3$.

Other objects, advantages, and salient features of the invention will become apparent from the following detailed description which, when viewed in conjunction with the appended drawings, describes the presently preferred embodiment of the invention.

DETAILED DESCRIPTION OF THE PRESENTLY PREFERRED EMBODIMENTS

Figure 1:
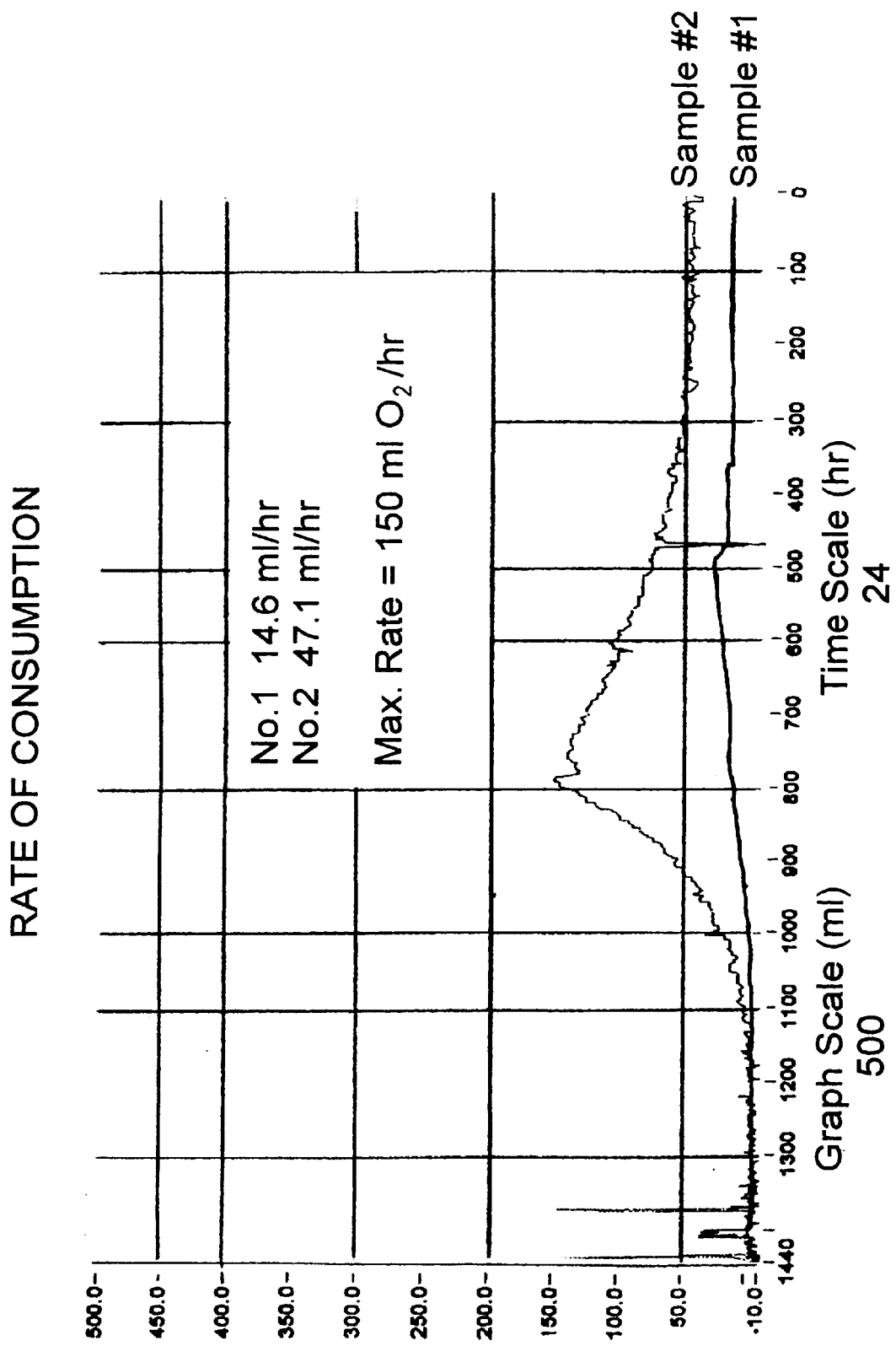
FIGS. 1 and 2 are respirometer charts respectively showing rate and volume of oxygen uptake or consumption by microbes in a simple nutritious medium over time, FIG. 1 showing oxygen use for microbes in a nutritious medium containing a prior art mineral supplement, and FIG. 2 showing oxygen use for microbes in a nutritious medium to which a mineral composite according to the invention has been added.

As is well known, a good soil generally consists of minerals, organic material, water, air, and microorganisms, and it is this combination which sustains the plant growth therein. The minerals contained in the soil are essential to growth of the microorganisms, as well as the plants. Of course, different soils will contain different minerals in different quantities, but it is recognized that plants remove at least 30 different kinds of minerals from the soil, including the big three or primary elements nitrogen (N), phosphorous (P), and potassium (K); the secondary minerals calcium (Ca), magnesium (Mg) and sulphur (S); and trace minerals including boron (B), chlorine (Cl), cobalt (Co), copper (Cu), iron (Fe), magnesium (Mn), molybdenum (Mo), sodium (Na), zinc (Zn) and silicon (Si).

It is also well recognized that as plants or crops are repeatedly grown and harvested, the minerals in the soil are removed with the harvested plants, so that the soil eventually becomes deficient in the various minerals. Conventionally, the deficiency has been addressed by applying compost and/or synthetic fertilizer containing nitrogen, phosphorous and potassium to the deficient soil. Although such practices are generally appropriate for achieving a favorable plant growth from the soil, many of the other minerals besides nitrogen, phosphorous and potassium, which may not be included in the synthetic fertilizer and may be present in compost only in small quantities, continue to be depleted from the soils. Such depletion is undesirable for many reasons, including a decreased activity of the beneficial microorganisms in the soil (which require other minerals beside nitrogen, phosphorous and potassium) which may result in a decreased growth rate of plants grown in the soil, and will result in a deficiency of nutrients in the plants which are grown in the soil making the plants less healthy for consumption, less resistant to disease, etc.

According to the present invention, there is provided a mineral composite consisting essentially of a naturally occurring glacial deposit comprising not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0–0.5 weight percent P, 0–0.01 weight percent Ba, and 0–0.005 weight percent Cr; and wherein the mineral composite is in powdered form with a mean particle size of 1–20$\mu$, and with a surface area of at least 0.8–1.5 m$^2$/cm$^3$. Preferably, the mean particle size is in a range of 1–5$\mu$.

The above components of the mineral composite are present in compound form, typically oxides, and the mineral composite also preferably comprises approximately 50–65 other elements due to the natural occurrence thereof in the glacial deposit, although the other elements are mostly present in relatively small quantities.

The other elements may include 2–15 weight percent C, 0.00005–0.005 weight percent of each of Ni and Zn, 0.0005–0.02 weight percent Rb, 0.005–0.1 weight percent Sr, 0.001–0.025 Zr, 0.0001–0.01 weight percent La, 0.00005–0.005 Gd, 0.00005–0.0005 Yb, 0.0001–0.0025 weight percent of each of Pb and Li, 0.00005–0.0150 weight percent Y, 0.00005–0.0025 weight percent Ce, 0.00001–0.0015 weight percent Yb, 0.0001–0.0025 weight percent B, 0.0005–0.01 weight percent Ga, 0.00005–0.0005 weight percent of each of Er and Lu, 0.0001–0.0025 weight percent V, 0.0001–0.0025 Sc, and trace amounts of Be, Co, Cu, Ge, As, Se, Nb, Mo, Ru, Rh, Pd, Cd, Sn, Te, Cs, Nd, Sm, Eu, Tb, Di, Ho, Tm, Hf, Ta, W, Os, Ir, Pt, Au, Hg, Tl, Th, Ag, Sb, Pr, Re, Bi, and U.

Also preferably, the mineral composite according to the invention will have average particle size of size of between 1 and 20 microns, possibly less than 10–15 microns, with at least 0.8 square meters of surface area per cubic centimeter of the mineral composite. This particle size is considerably smaller than that taught by the prior art. Smaller particle size is an advantage, because it presents a larger surface area to the environment, allows quicker dissolution of the dissolvable minerals therein, and is accordingly more effective, for a given amount, than a similar composition having a larger median particle size. In a preferred embodiment of the present invention, the particle size of the composite is relatively consistent and substantially uniform.

According to a primary aspect of the present invention, the mineral composite according to the preferred embodiment replaces or introduces all of the important minerals back into the soil in a combination, and in a finely ground form, which permits them to be readily assimilated by the microorganisms and plants growing in the soil. It is an important feature of the mineral composite according to the present invention that the silicon content of the composite be 20 percent or less, since silica is more or less inert as far as growing plants are concerned, other than as a supportive substrate. A lower proportion of silica will mean a higher proportion of compounds which are more useful to plant life and to fungi.

The optimum amount of the mineral composite to be added to soil will vary depending on the organic content of the soil. Generally, if the soil contains a larger percentage of organic material such as compost, humus, etc., then a larger quantity of the mineral composite may be added thereto because the larger content of organic material in the soil can properly sustain enhanced microbiological activity as stimulated by the mineral composite. Generally, applicant has found that 2–12 kg of the mineral composite may be added per $m^3$ of most soils, and preferably 2–7 kg, although more or less of the composite may be added as desired. Additionally, it is possible and desirable to add the mineral composite to compost as the compost is being formed, and then the compost, having the mineral composite therein, may be subsequently added to the soil after it is fully composted. Alternatively, the mineral composite may be added to stabilized compost which has been completely composted, in an amount ranging from about 1–12 kg per cubic meter of compost, and the compost may then be spread on or mixed into the soil in the normal way.

The method of treating soil with the addition thereto of the mineral composite according to the invention may include an additional step of mixing the mineral composite with a beneficial soil additive before adding it to the soil. The beneficial soil additive may include one or more items selected from the group consisting of spores of Mycorrhizal fungi, living bacteria, and a biodegradable carbon source. Useful biodegradable carbon sources include humates, stabilized compost, and a biodegradable source of carbohydrates, such as, e.g. an agricultural product or by-product, as a food source for microorganisms.

Mycorrhizae are symbiotic soil fungi that attach themselves directly to the roots of growing plants. While not wishing to be bound by any theory, it is believed that mycorrhizae benefit plants which they are in contact with, by acting as "feeder roots" and increasing the effective root area of the plant. Mycorrhizae spores are commercially available from various sources such as, e.g., Bio/Organics, Inc. of Camarillo, Calif. (www.bio-organics.com).

Beneficial soil bacteria are commercially available from Inter-Bio, Inc. of Houston, Tex.

The term "humates", as used herein, means highly concentrated and decomposed humus material in powdered form, which may be extracted from lignite coal.

It has also been found that the mineral composite according to the present invention is useful in treating waste material containing organic matter, such as sewage sludge or waste water.

According to another preferred aspect of the invention, the mineral composite according to the invention is preferably acquired as the fines or gravel dust of a gravel mine, glacial deposit, etc., which is further pulverized in a ball mill, roller mill, etc. to a very fine powder. As discussed above, the mean particle size of the mineral composite powder will be in the range of 1–20 microns ($\mu$), may be 1–10 microns, and could be in the range of 1–5 microns, and the powder will have the surface area of at least 0.80 $m^2/cm^3$ of powder, and most preferably at least 1.0 $m^2/cm^3$ of the powder. Applicant has found that because of such particle size and surface area, the powder is readily assimilated by the microbes and plants growing in the soil, and an average size treatment of the composite is almost completely used up in a one year growing cycle. This desirably reflects the fact that the plants growing in the soil readily uptake the minerals of the mineral composite.

EXAMPLE I

A sample of a finely divided mineral composite according to the present invention was sent out to an independent testing laboratory for size analysis. The test results showed that the sample of the mineral composite had particle sizes as follows, based on the total number of particles in the test sample:

TABLE 1

| 0.2–1 micron | 23.6% |
| 1.0–2.5 microns | 63.2% |
| 2.5–5.0 microns | 11.0% |
| 5–10 microns | 1.8% |
| 10–20 microns | 0.4% |
| Total | 100% |

An inspection of the above-listed size data shows that the mineral composite according to the present invention has a considerably smaller average particle size than the previously known mineral composites, with nearly 87% of the particles measuring 2.5 microns or smaller, with 97.8% of the particles measuring 5.0 microns or smaller, and with 99.6% of the particles measuring 10 microns or smaller.

EXAMPLE II

Particularly, applicant has determined that a liquid solution containing a mineral composite having a composition as set forth below in Table 2 and having a mean particle size of 1–20μ, preferably 1–10 μ, and possibly 1–5 μ, and a surface area of at least 0.8 m²/cm³, and preferably at least 1.0 m²/cm³, achieves an overall increase of at least 50% in the activity of microbiological organisms (according to oxygen consumption as measured by a respirometer) in comparison to another liquid solution containing microbiological organisms having an equal concentration of a competitive prior art mineral composite added thereto. See FIGS. 1 and 2.

Figure 2:
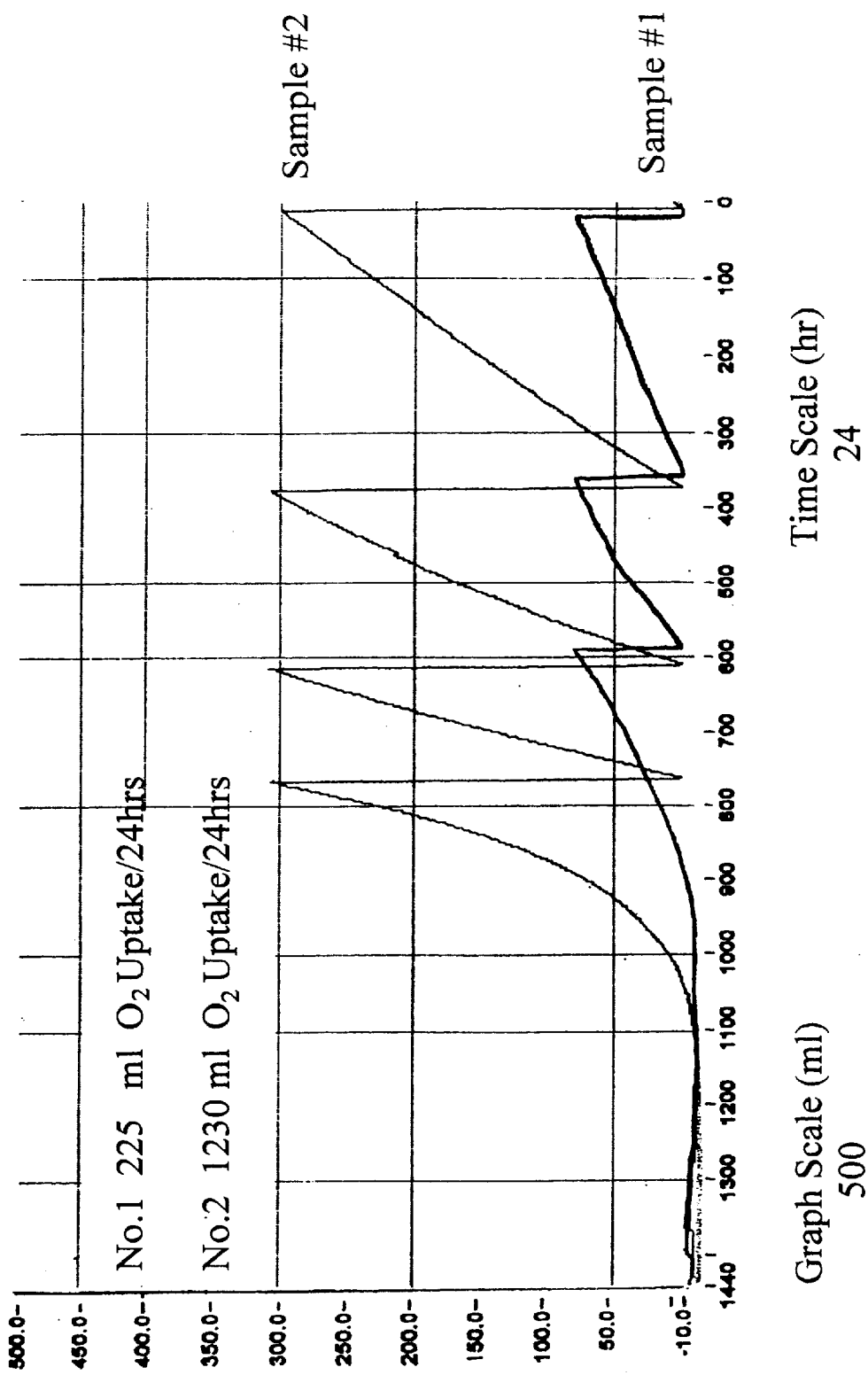

For each of the charts shown in FIGS. 1 and 2, identical 1.5 liter volumes of a pulp and paper liquid waste stream were used which contained aerobic bacteria, and to these samples were added equal 0.5 gram amounts of first and second mineral composite materials, respectively. The two tests were set up identically to one another, including temperature and duration of the test over a 24 hour period.

Sample 1 was a product sold under the trademark "BIO-II" by the Meridian Environmental Group of Okemos, Mich. It is the present applicant's understanding and belief that this product was a commercial embodiment of the teaching of U.S. Pat. No. 4,297,122.

Sample 2 was a product which was a commercial embodiment of a product according to the teaching of the present invention.

As shown in FIGS. 1 and 2, there was little difference in oxygen uptake between the first and second samples for the first few hours, but thereafter the microorganisms in the solution according to the invention began using more than double the amount of oxygen in comparison to the solution treated with the competitive compound, until the material on which the microbes were feeding was close to being totally consumed.

The following table, Table 2, shows possible weight ranges of elements in a mineral composite according to the invention, and also shows an analysis of a sample mineral composite according to the invention.

TABLE 2

| Element | Symbol | Concentration Range weight (ppm) | Typical Concentration weight (ppm) |
|---|---|---|---|
| Beryllium | Be | 0.0–1.0 | <0.5 |
| Sodium | Na | 500.00–50,000.0 | 8045.00 |
| Magnesium | Mg | 20,000–100,000 | 54384.00 |
| Aluminum | Al | 10,000–50,000 | 26811.00 |
| Silicon | Si | 100,000–200,000 | 161971.00 |
| Phosphorus | P | 100–10,000 | 384.00 |
| Potassium | K | 10,000–100,000 | 27090.00 |
| Calcium | Ca | 100,000–200,000 | 137089.00 |
| Scandium | Sc | 1–25 | 6.35 |
| Titanium | Ti | 100–10,000 | 1550.00 |
| Vanadium | V | 1–250 | 12.95 |
| Chromium | Cr | 0.5–50 | 3.40 |
| Manganese | Mn | 50–5,000 | 661.00 |
| Iron | Fe | 10,000–100,000 | 32174.00 |
| Cobalt | Co | 0.5–50 | 0.65 |
| Nickel | Ni | 0.5–50 | 1.65 |
| Copper | Cu | 0–1 | <0.5 |
| Zinc | Zn | 0.5–50 | 2.70 |
| Germanium | Ge | 0–1 | <0.5 |
| Arsenic | As | 0–25 | <2.2 |
| Selenium | Se | 0–1 | <0.5 |
| Rubidium | Rb | 5–200 | 28.15 |
| Strontium | Sr | 50–1000 | 167.00 |
| Yttrium | Y | 0.5–150 | 9.75 |
| Zirconium | Zr | 1–250 | 49.55 |
| Niobium | Nb | 0.5–25 | 3.65 |
| Molybdenum | Mo | 0–1 | <0.5 |
| Ruthenium | Ru | 0–1 | <0.5 |

TABLE 2-continued

| Element | Symbol | Concentration Range weight (ppm) | Typical Concentration weight (ppm) |
|---|---|---|---|
| Rhodium | Rh | 0–1 | <0.5 |
| Carbon | C | 20,000–150,000 | 5.70% |
| Palladium | Pd | 0–1 | <0.5 |
| Cadmium | Cd | 0–1 | <0.5 |
| Tin | Sn | 0–1 | <0.5 |
| Tellurium | Te | 0–1 | <0.5 |
| Cesium | Cs | 0–1 | <0.5 |
| Barium | Ba | 1–100 | 18.50 |
| Lanthanum | La | 1–100 | 19.80 |
| Cerium | Ce | 0.5–25 | 2.70 |
| Neodymium | Nd | 0–1 | <0.5 |
| Samarium | Sm | 0–1 | <0.5 |
| Europium | Eu | 0–1 | <0.5 |
| Gadolinium | Gd | 0.5–50 | 8.80 |
| Terbium | Tb | 0–1 | <0.5 |
| Dyprosium | Dy | 0–1 | <0.5 |
| Holmium | Ho | 0–1 | <0.5 |
| Thulium | Tm | 0–1 | <0.5 |
| Ytterbium | Yb | 0.1–15 | 1.50 |
| Hafnium | Hf | 0–1 | <0.5 |
| Tantalum | Ta | 0–1 | <0.5 |
| Tungsten | W | 0–1 | <0.5 |
| Osmium | Os | 0–1 | <0.5 |
| Iridium | Ir | 0–1 | 0.05 |
| Platinum | Pt | 0–1 | <0.5 |
| Gold | Au | 0–1 | <0.5 |
| Mercury | Hg | 0–1 | <0.5 |
| Thallium | Tl | 0–1 | <0.5 |
| Lead | Pb | 1–25 | 3.85 |
| Thorium | Th | 0–1 | <0.5 |
| Lithium | Li | 1–25 | 3.81 |
| Boron | B | 1–25 | 6.84 |
| Gallium | Ga | 5–100 | 21.48 |
| Silver | Ag | 0–5 | 0.50 |
| Antimony | Sb | 0–1 | 0.10 |
| Praseodymium | Pr | 0–1 | <0.5 |
| Erbium | Er | 0.5–5 | 1.25 |
| Lutetium | Lu | 0.5–5 | 1.67 |
| Rhenium | Re | 0–2 | 0.24 |
| Bismuth | Bi | 0–5 | 0.43 |
| Uranium | U | 0–1 | <0.5 |

EXAMPLE III

A comparative study was made of the amount of growth of total and active bacteria and total and active fungi in two groups of soil-filled pots, without any plants growing therein. The soil used was from adjacent areas of an organic grower's field. In a first control group of three pots, the soil was not fertilized or supplemented, was watered, and was otherwise left alone. In a second group of three test pots, the soil was supplemented by the addition of a mineral composite in accordance with the present amendment, in a ratio of one tablespoon of the product per 6 inch clay pot. In this particular test, no plants were grown in the soil.

Within the first seven days, total fungal biomass was increased by nearly a third greater in the pots supplemented with the mineral composite. Within two weeks, active fungal biomass was increased by a factor of a fourth greater in the supplemented test pots, and the increase in total fungal biomass was maintained. Total fungal biomass assesses the active as well as the inactive or dormant fungi in the soil. Active fungal biomass is that portion of the total fungal biomass that is metabolically very active, and which will reproduce within 24 hours. The total bacterial biomass was also found to have doubled in two weeks in the test pots provided with the mineral composite. Moreover, the mineral composite pots showed no harmful effects to protozoa or nematodes during the two-week test.

The fungi assessed in this experiment did not include mycorrhizal fungi, because there were no plants included in the system, in this particular test. However, since the material according to the invention acts as a nutrient resource for saprophytic fungi, not requiring a living plant host, it will clearly perform the same function for mycorrizal fungi.

EXAMPLE IV

Add a finely ground mineral composite, in accordance with the present invention, to an area of soil to be planted, in an amount ranging from 1 to 12 kilograms per cubic meter of soil. The pulverized mineral composite should include not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0–0.5 weight percent P, 0–0.01 weight percent Ba and 0–0.005 Cr. The mineral composite should be in powdered form with a mean particle size of 1–20$\mu$. Mix thoroughly, preferably with a shovel or pitchfork.

Then, after the soil has been pretreated with the mineral composite according to the invention, treat the soil with spores of Mycorrhizal fungi, in an area where plant roots are likely to grow. This can be accomplished by mixing the spores into the soil in an area at or below where the roots are likely to be located, or alternatively, by dipping the roots of a seedling, before planting, in a composition containing mycorrhizae spores. A mixture of spores of different varieties is preferred. A young plant or seed should then be planted and watered in the prepared earth.

Alternatively, the mycorrhizae spores may be added directly to the mineral composite of the invention, in an effective amount as recommended by the manufacturer or distributor thereof, and then the mixture may be added to the soil, and mixed therewith, in an amount ranging from about 1–12 kg per cubic meter of soil, and preferably, about 1–7 kg per cubic meter.

Although there has been described what is at present considered to be the preferred embodiment of the invention, the foregoing description is intended to be illustrative, and not restrictive. It will be understood by persons skilled in the art that variations and modifications may be made thereto without departing from the spirit and essence of the invention.

I claim:

1. A method of treating soil to increase the activity of microorganisms therein, comprising a step of adding a soil-enhancing composition comprising a pulverized mineral composite to the soil, in an amount ranging from 2 to 12 kilograms per cubic meter of soil, said pulverized mineral composite comprising not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0–0.5 weight percent P, 0–0.01 weight percent Ba and 0–0.005 Cr;

wherein said mineral composite is in powdered form with a mean particle size less than or equal to 9 $\mu$;

and further wherein said mineral composite has a surface area of at least 0.8 $m^2/cm^3$.

2. The method of claim 1, wherein said mineral composite is added in an amount ranging from 2 to 7 kilograms per cubic meter of soil.

3. The method of claim 1, wherein said soil-enhancing composition further comprises a beneficial soil additive selected from the group consisting of spores of Mycorrhizal fungi, living bacteria, a biodegradable carbon source, and mixtures thereof.

4. The method of claim 3, wherein said beneficial soil additive comprises at least one biodegradable carbon source selected from the group consisting of humates, compost, a biodegradable carbohydrate source, and mixtures thereof.

5. The method of claim 3, wherein said beneficial soil additive comprises a mixture of spores of different varieties of mycorrhizal fungi.

6. A method of treating soil to increase the activity of microorganisms therein, comprising a step of adding a soil-enhancing composition comprising a pulverized mineral composite to the soil in an amount ranging from 2 to 12 kilograms per cubic meter of soil, said pulverized mineral composite comprising not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0.005–0.5 weight percent P, 0–0.01 weight percent Ba, and 0–0.005 Cr;

wherein said mineral composite is in powdered form with a mean particle size less than or equal to 5 $\mu$;

wherein the particles making up the composite material are substantially uniform in size;

and further wherein said mineral composite has a surface area of at least 0.8 $m^2/cm^3$.

7. The method of claim 6, wherein said mineral composite is added in an amount ranging from 2 to 7 kilograms per cubic meter of soil.

8. The method of claim 6, wherein said soil-enhancing composition further comprises a beneficial soil additive selected from the group consisting of spores of Mycorrhizal fungi, living bacteria, a biodegradable carbon source, and mixtures thereof.

9. The method of claim 8, wherein said biodegradable carbon source is selected from the group consisting of humates, compost, a biodegradable carbohydrate source, and mixtures thereof.

10. The method of claim 8, wherein said beneficial soil additive comprises a mixture of spores of different varieties of mycorrhizal fungi.

11. The method of claim 6, further comprising the steps of:

planting immature food-crop flora, selected from the group consisting of seeds and young plants, in the treated soil; and allowing said immature food-crop flora to grow to maturity;

whereby crops produced by said food-crop flora have an enhanced mineral content.

12. A method of producing edible plants having an enhanced mineral content, comprising the steps of:

a) adding a soil-enhancing composition comprising a pulverized mineral composite to a plant growth medium in an amount ranging from 2 to 12 kilograms per cubic meter of said medium, said pulverized mineral composite comprising not more than 20 weight percent Si, 10–20 weight percent Ca, 2–10 weight percent Mg, 2–10 weight percent Fe, 1–10 weight percent K, 1–5 weight percent Al, 0–3.0 weight percent Na, 0–5.0 weight percent Ti, 0–1.0 weight percent Mn, 0.005–0.5 weight percent P, 0–0.01 weight percent Ba and 0–0.005 Cr;

wherein said mineral composite is in powdered form with a mean particle size less than or equal to 9 $\mu$;

b) planting immature food-crop flora, selected from the group consisting of seeds and young plants, in the treated growth medium; and c) allowing said immature food-crop flora to grow to maturity;

whereby crops produced by said food-crop flora have an enhanced mineral content.

13. The method of claim 12, wherein said mineral composite is added in an amount ranging from 2 to 7 kilograms per cubic meter of soil.

14. The method of claim 12, wherein said soil-enhancing composition further comprises a beneficial soil additive selected from the group consisting of spores of Mycorrhizal fungi, living bacteria, a biodegradable carbon source, and mixtures thereof.

15. The method of claim 13, wherein said biodegradable carbon source is selected from the group consisting of humates, compost, a biodegradable carbohydrate source, and mixtures thereof.

16. The method of claim 13, wherein said beneficial soil additive comprises a mixture of spores of different varieties of mycorrhizal fungi.

17. The method of claim 13, wherein the mineral composite has a surface area of at least $0.8 \text{ m}^2/\text{cm}^3$.

* * * * *